(12) United States Patent
Kitajima et al.

(10) Patent No.: US 6,956,298 B2
(45) Date of Patent: Oct. 18, 2005

(54) CONTROL APPARATUS FOR HYBRID VEHICLE

(75) Inventors: Shinichi Kitajima, Utsunomiya (JP); Tomohiro Shibata, Shioya-gun (JP); Asao Ukai, Utsunomiya (JP); Yasuo Nakamoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 10/738,219

(22) Filed: Dec. 18, 2003

(65) Prior Publication Data
US 2004/0176211 A1 Sep. 9, 2004

(30) Foreign Application Priority Data
Jan. 22, 2003 (JP) .............................. 2003-013526

(51) Int. Cl.[7] ............................................. B60L 11/16
(52) U.S. Cl. .................................. 290/40 C; 180/65.2
(58) Field of Search ..................... 290/40 C; 180/65.2, 180/65.3

(56) References Cited

U.S. PATENT DOCUMENTS

| | | | | |
|---|---|---|---|---|
| 5,722,502 A | * | 3/1998 | Kubo ......................... | 180/65.4 |
| 5,786,640 A | | 7/1998 | Sakai et al. .................... | 290/17 |
| 6,166,517 A | * | 12/2000 | Wakashiro et al. .......... | 320/104 |
| 6,204,636 B1 | * | 3/2001 | Kinoshita et al. ........... | 320/134 |
| 6,242,873 B1 | * | 6/2001 | Drozdz et al. ............... | 318/139 |
| 6,304,055 B1 | * | 10/2001 | Winstead ..................... | 320/104 |
| 6,314,346 B1 | * | 11/2001 | Kitajima et al. .............. | 701/22 |
| 6,362,602 B1 | | 3/2002 | Kozarekar ................... | 320/160 |
| 6,523,626 B2 | * | 2/2003 | Wakashiro et al. ......... | 180/65.2 |
| 6,536,207 B1 | * | 3/2003 | Kamen et al. ................ | 60/39.6 |
| 6,561,295 B1 | * | 5/2003 | Kuroda et al. ............. | 180/65.2 |
| 6,569,055 B2 | * | 5/2003 | Urasawa et al. ............... | 477/5 |
| 6,659,213 B2 | * | 12/2003 | Kubo et al. ................. | 180/65.4 |
| 6,702,052 B1 | * | 3/2004 | Wakashiro et al. ......... | 180/65.2 |
| 2002/0065165 A1 | | 5/2002 | Lasson et al. ................. | 477/3 |
| 2003/0218447 A1 | * | 11/2003 | Coates et al. ............... | 320/134 |

FOREIGN PATENT DOCUMENTS

| | | |
|---|---|---|
| EP | 1 008 484 A2 | 6/2000 |
| EP | 1375241 A1 * | 1/2004 ........... B60L 15/20 |
| JP | 3300294 | 4/2002 |

\* cited by examiner

*Primary Examiner*—Joseph Waks
(74) *Attorney, Agent, or Firm*—Arent Fox PLLC

(57) ABSTRACT

A control apparatus for a hybrid vehicle includes an engine and a motor as power sources of the hybrid vehicle, an energy storage device for storing electrical energy converted, by the motor, from the output power of the engine or the kinetic energy of the hybrid vehicle, and a control device which is adapted to obtain, at every stop of the hybrid vehicle, a first difference between the state of charge of the energy storage device at the immediately previous stop of the hybrid vehicle and the current state of charge, and to change an amount of power generation by the motor depending on the first difference when driving of the hybrid vehicle is not performed by the motor or when a regenerative deceleration operation is not performed by the motor.

8 Claims, 9 Drawing Sheets

CONTROL APPARATUS FOR HYBRID VEHICLE

BACKGROUND OF THE INVENTION

1. Field of the Invention

The present invention relates to a control apparatus for a hybrid vehicle, and more specifically, the present invention relates to a control apparatus for a hybrid vehicle in which the power of an engine thereof is supplemented by power from a motor, and the power generation operation by the motor is controlled depending on electrical energy (hereinafter referred to as a state of charge) stored in an energy storage device.

Priority is claimed on Japanese Patent Application No. 2003-13526, filed Jan. 22, 2003, the content of which is incorporated herein by reference.

2. Description of Related Art

Among hybrid vehicles, a type of hybrid vehicle is known in which the state of charge of the energy storage device thereof is monitored, and when the energy storage device tends to discharge energy, the control mode of the motor thereof is changed from a discharging mode to a charging mode so that electrical energy is sent to the energy storage device from the motor, and so that the energy balance in the energy storage device is recovered (see, for example, Published Japanese Patent No. 3300294).

In the above known hybrid vehicle, a control operation is executed so that the state of charge of the energy storage device is recovered in such a manner that when the state of charge of the energy storage device decreases by a predetermined amount from the initial state of charge at the beginning of the run, an assist frequency, which is frequency of events in which the power of the engine is supplemented by the motor, is decreased, an amount of assist, which is auxiliary power to be added to the power of the engine, is decreased, and an amount of power generation during a cruise mode (i.e., an amount of charging energy for the energy storage device) is set to be greater until the state of charge of the energy storage device is recovered to a predetermined level.

By using a control apparatus for the above hybrid vehicle, when the state of charge of the energy storage device decreases by a predetermined amount, the state of charge of the energy storage device can be recovered to at least the initial state of charge; therefore, the state of charge, which is difficult to be directly measured, can be controlled so that, at least, the state of charge is not decreased; however, because the running conditions of the vehicle change every moment until the state of charge of the energy storage device is recovered to a predetermined level, it is desired that the state of charge of the energy storage device be precisely controlled depending on the running conditions of the vehicle.

SUMMARY OF THE INVENTION

In view of the above circumstances, an object of the present invention is to provide a control apparatus for a hybrid vehicle, which periodically obtains information about the state of charge of the energy storage device so that the engine is assisted by the motor in a precisely controlled manner, and the power generation operation by the motor is also precisely controlled.

In order to achieve the above object, the present invention provides a control apparatus for a hybrid vehicle including: an engine and a motor as power sources of the hybrid vehicle; an energy storage device for storing electrical energy converted, by the motor, from the output power of the engine or the kinetic energy of the hybrid vehicle; and a control device which is adapted to obtain, at every stop of the hybrid vehicle, a first difference between the state of charge of the energy storage device at the immediately previous stop of the hybrid vehicle and the current state of charge, and to change an amount of power generation by the motor depending on the first difference when driving of the hybrid vehicle is not performed by the motor or when a regenerative deceleration operation is not performed by the motor.

According to the control apparatus constructed as above, when it is determined that the change in the state of charge of the energy storage device tends to decrease based on the first difference between the state of charge of the energy storage device at the immediately previous stop of the hybrid vehicle and the current state of charge, the amount of power generation by the motor can be decreased when driving of the hybrid vehicle is not performed by the motor or when a regenerative deceleration operation is not performed by the motor; therefore, the motor can be precisely controlled depending on the state of charge at every stop of the hybrid vehicle.

In the above control apparatus for a hybrid vehicle, the control device may be further adapted to obtain, at every stop of the hybrid vehicle, a second difference between the initial state of charge of the energy storage device at the beginning of a running operation of the hybrid vehicle and the current state of charge, and to change an amount of driving power of the motor depending on the second difference.

According to the control apparatus constructed as above, the amount of driving power of the motor in the next running interval of the hybrid vehicle can be adjusted based on the second difference between the initial state of charge of the energy storage device at the beginning of a running operation of the hybrid vehicle and the current state of charge; therefore, the amount of supplementary driving power of the motor can be precisely controlled depending on the state of charge at every stop of the hybrid vehicle.

The present invention further provides a control apparatus for a hybrid vehicle including: an engine as a power source of the hybrid vehicle; a motor for supplying supplementary power to the engine; an energy storage device for storing electrical energy converted, by the motor, from the output power of the engine or the kinetic energy of the hybrid vehicle; and a control device, wherein the control device includes: a running state determining section for determining the running state of the hybrid vehicle; a state of charge calculating section for calculating the state of charge of the energy storage device; a first difference calculating section for calculating, at every stop of the hybrid vehicle, a first difference between the state of charge of the energy storage device at the immediately previous stop of the hybrid vehicle and the current state of charge using outputs from the running state determining section and the state of charge calculating section; and a motor control changing section for comparing the first difference with a predetermined reference value and for changing a control operation for the motor when the first difference is greater than the predetermined reference value.

According to the control apparatus constructed as above, the motor can be operated in a zone in which the motor is not supposed to operate, e.g., in a zone in which the motor performs neither an assist operation for the engine nor a deceleration regeneration operation, or in a zone in which the motor performs neither a driving operation nor a deceleration regeneration operation.

In the above control apparatus for a hybrid vehicle, the control device may further include a second difference calculating section for calculating, at every stop of the hybrid vehicle, a second difference between the initial state of charge of the energy storage device at the beginning of a running operation of the hybrid vehicle and the current state of charge, and the motor control changing section may be adapted to change an amount of the supplementary power supplied from the motor to the engine depending on the second difference.

According to the control apparatus constructed as above, the amount of driving power of the motor in the next running of the hybrid vehicle can be adjusted based on the second difference between the initial state of charge of the energy storage device at the beginning of a running operation of the hybrid vehicle and the current state of charge; therefore, the amount of supplementary driving power of the motor can be precisely controlled depending on the state of charge at every stop of the hybrid vehicle.

In the above control apparatus for a hybrid vehicle, the reference value may be determined depending on a vehicle speed.

According to the control apparatus constructed as above, the reference value can be determined while assuming that the greater the current vehicle speed, the greater the kinetic energy of the vehicle during the coming deceleration.

In the above control apparatus for a hybrid vehicle, the control device may further include a zone determining section for determining whether the current state of charge of the energy storage device is in a normal use zone, in an over-discharged zone, or in an over-charged zone, and the motor control changing section may be adapted to change the control operation for the motor when the state of charge of the energy storage device is in a normal use zone.

According to the control apparatus constructed as above, the control operation for the motor can be changed without applying restriction to an energy management in the hybrid vehicle while maintaining the state of charge of the energy storage device in an appropriate state, i.e., not in an over-charged state or not in an over-discharged state.

In the above control apparatus for a hybrid vehicle, the motor control changing section may be adapted to change an amount of power generation by the motor when the motor is driven as a generator by the engine.

According to the control apparatus constructed as above, an amount of charging energy to the energy storage device can be appropriately adjusted by changing the amount of power generation by the motor.

In the above control apparatus for a hybrid vehicle, the motor may be adapted to be controlled in an acceleration mode, in a deceleration mode, and in a cruise mode, and the motor control changing section may be adapted to change the amount of power generation by the motor at least during the cruise mode.

According to the control apparatus constructed as above, the power generation operation by the motor is more frequently executed during the cruise mode so that the state of charge of the energy storage device is maintained in an appropriate state, and a demand of power assist requested by the engine can be fulfilled.

DETAILED DESCRIPTION OF THE INVENTION

Preferred embodiments of the present invention will now be explained with reference to the appended drawings.

Figure 1:
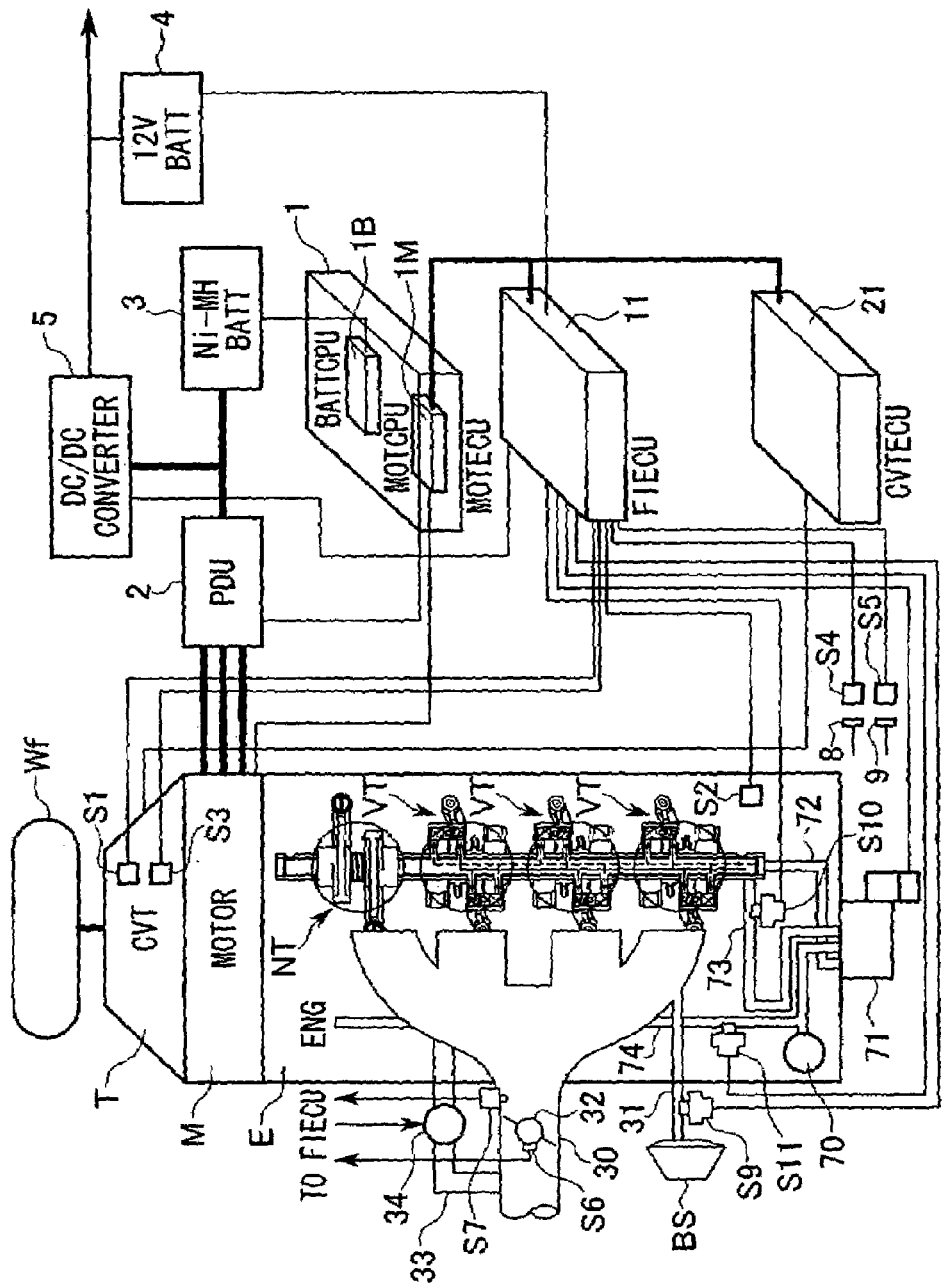
FIG. 1 is a block diagram showing the general structure of an embodiment of the present invention.

FIG. 1 is a block diagram schematically illustrating a parallel hybrid vehicle in an embodiment of the present invention, in which an engine E, a motor M, and a transmission T are directly coupled to each other in series. The driving force generated by both the engine E and the motor M is transmitted via, for example, a CVT (continuously variable transmission) as the transmission T (the transmission T may be a manual transmission) to front wheels Wf as driving wheels. When the driving force is transmitted from the driving wheels Wf to the motor M during deceleration of the hybrid vehicle, the electric motor M acts as a generator for applying a so-called regenerative braking force to the vehicle, i.e., the kinetic energy of the vehicle is recovered and stored as electric energy.

The powering operation and the regenerating operation of the motor M are controlled by a power drive unit (PDU) 2 according to control commands from a motor CPU 1 M of a motor ECU 1. A high-voltage nickel metal hydride (Ni—MH) battery 3 (hereinafter simply referred to as a battery 3) as an energy storage device for sending and receiving electric energy to and from the motor M is connected to the power drive unit 2. The battery 3 includes plural modules connected in series, and in each module, plural cell units are connected in series. The hybrid vehicle includes a 12-volt auxiliary battery 4 for energizing various accessories. The auxiliary battery 4 is connected to the battery 3 via a downverter 5 which is a DC-DC converter.

The downverter 5, controlled by an FIECU 11 (which acts as a running state determining section and a zone determining section), makes the voltage from the battery 3 step-down and charges the auxiliary battery 4. Note that the motor ECU 1 includes a battery CPU 1B (which acts as a state of charge calculating section) for protecting the battery 3 and calculating the remaining battery charge thereof. In addition, a CVTECU 21 is connected to the transmission T, which is a CVT, for controlling the same.

The FIECU 11 controls, in addition to the motor ECU 1 and the downverter 5, a fuel injection valve (not shown) for controlling the amount of fuel supplied to the engine E, a starter motor, ignition timing, etc. To this end, the FIECU 11 receives various signals such as a signal from a speed sensor S1 for sensing vehicle speed VP, a signal from an engine revolution rate sensor S2 for sensing engine revolution rate NE, a signal from a shift position sensor S3 for sensing the shift position of the transmission T, a signal from a brake switch S4 for detecting the operation of a brake pedal 8, a signal from an accelerator pedal switch S5 for detecting the operation of accelerator pedal 9, a signal from a throttle opening-degree sensor S6 for sensing the degree of throttle opening TH of a throttle valve 32, a signal from an intake negative pressure sensor S7 for sensing negative pressure in the air-intake passage.

Reference symbol BS indicates a booster associated with the brake pedal, in which a master vac negative pressure sensor S9 is provided for sensing negative pressure in the brake master vac (hereinafter referred to as master vac negative pressure). The master vac negative pressure sensor S9 is connected to the FIECU 11.

The intake negative pressure sensor S7 and the throttle opening-degree sensor S6 are provided in an air-intake passage 30, and the master vac negative pressure sensor S9 is provided in a communication passage 31 connected to the air-intake passage 30.

The air-intake passage 30 is provided with a secondary air passage 33 for air communication between the upstream portion with respect to the throttle valve 32 and the downstream portion, and the secondary air passage 33 is provided with a control valve 34. The purpose of providing the secondary air passage 33 is to supply a small amount of air into the cylinders even when the air-intake passage 30 is completely closed by the throttle valve 32. The control valve 34 is controlled by means of the signal from the FIECU 11 in accordance with the intake negative pressure measured by the intake negative pressure sensor S7.

The engine E includes three cylinders, each of which is associated with the variable valve timing mechanism VT on both an intake side and an exhaust side, and a cylinder associated with a conventional valve mechanism NT which has no relationship to the cylinder deactivation operation.

In other words, the engine E is a deactivatable engine in which the operation state may be alternated between normal operation in which all four cylinders including three deactivatable cylinders are active and a cylinder deactivation operation in which three deactivatable cylinders are inactive. In the engine E, the operation of the intake valves IV and exhaust valves EV associated with the deactivatable cylinders can be temporarily suspended by means of the variable valve timing mechanisms VT.

Reference numeral 70 indicates an oil pump, and reference numeral 71 indicates a spool valve which is connected to the discharge port of the oil pump 70. The oil pump 70 and the spool valve 71 cooperate with each other so that oil pressure is applied to the variable valve timing mechanisms VT. More specifically, the operation state of the engine E can be alternated between the all-cylinder operation and the cylinder deactivation operation by applying oil pressure from the oil pump 70 to a cylinder deactivation passage 72 and a cylinder activation passage 73 of the spool valve 71 so that the variable valve timing mechanisms VT are operated. A POIL sensor S10 for measuring the pressure of the operation oil, a solenoid of the spool valve 71, and a TOIL sensor S11 for measuring the temperature of the operation oil are also connected to the FIECU 11.

Next, zoning of the state of charge SOC of the battery, i.e., classifying the state of charge into zones, will be explained below. The state of charge of the battery is calculated in a battery CPU 1B based on, for example, voltage, discharging current, temperature, etc.

As an example of zoning, first, a zone A which is a normal use zone (from SOC 40% to SOC 75%) is set, a zone B which is a temporary use zone (from SOC 25% to SOC 40%) is set below the zone A, and a zone C which is an over-discharged zone (from SOC 0% to SOC 25%) is set below the zone B. Furthermore, a zone D which is an over-charged zone (from SOC 75% or more) is set above the zone A.

Next, the operation modes of the motor M will be explained. The operation modes of the motor M include an "idle mode", an "idle stop mode", a "deceleration mode", a "cruise mode", and an "acceleration mode". In the idle mode, fuel supply is re-started after fuel cut operation, and the engine E is maintained in an idling state. In the idle stop mode, the engine is stopped under certain conditions when, for example, the vehicle does not run. In the deceleration mode, a regenerative braking operation is performed by the motor M. In the acceleration mode, the driving power (the output power) of the engine E is supplemented by the motor M. In the cruise mode, the motor M performs neither the powering operation nor the deceleration regeneration operation, i.e., the vehicle is driven solely by the engine E, and the motor M is driven so as to act as a generator and so that the battery 3 is charged (hereinafter referred to as "cruise power generation") without applying any effects on the running state of the vehicle.

Figure 2:
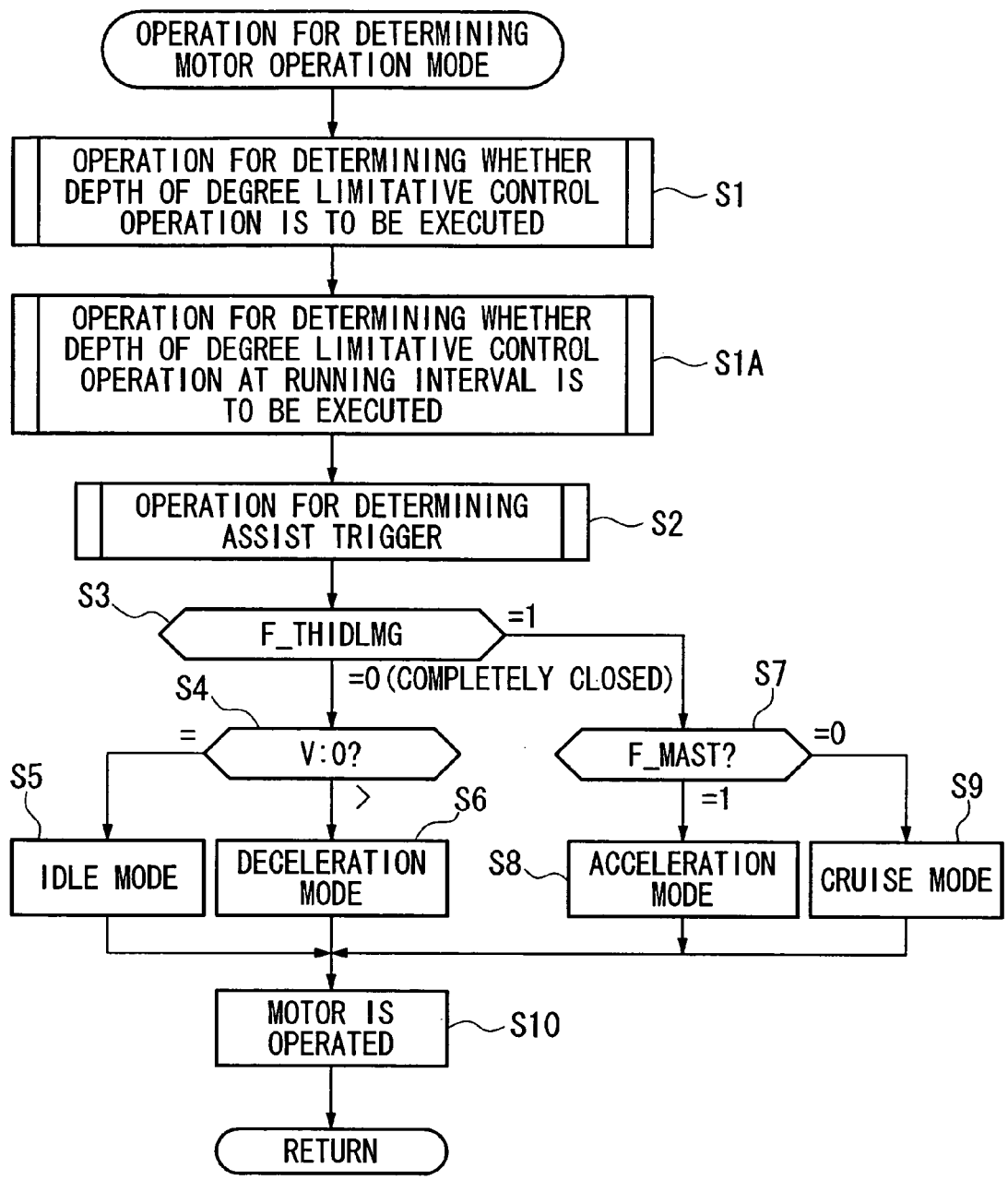
FIG. 2 is a flowchart showing the operation for determining the motor operation mode according to an embodiment of the present invention.

More specifically, the operation for determining the motor operation mode will be explained below with reference to the flowchart shown in FIG. 2.

In step S1 in the flowchart shown in FIG. 2, the operation for determining whether the depth of discharge limitative control is to be executed (i.e., the operation for setting the flag value of a DOD limitative control indication flag F_DODLMT, which will be explained below), which will be more specifically explained below, is executed, and in step S1A, the operation for determining whether the depth of discharge limitative control at every running interval is to be executed (i.e., the operation for setting the flag value of a flag F_DODLMTV indicating whether a cruise power generation correction coefficient is to be changed, which will be explained below), is executed. In subsequent step S2, the operation for determining assist trigger (i.e., the operation for setting the flag value of a flag F_MAST indicating whether assist by the motor M is to be performed), which will be more specifically explained below, is executed, and in step S3, it is determined whether or not the throttle is completely closed based on a flag F_THIDLING indicating whether the throttle is completely closed.

When the DOD limitative control indication flag F_DODLMT is "1", the motor M is operated in a DOD limitative power generation mode (step S208) during the cruise mode which will be explained below, and when the DOD limitative control indication flag F_DODLMT is "0", the motor M is not operated in the DOD limitative power generation mode. When the flag F_MAST is "1", the motor M is operated so as to supplement the output power of the engine E (i.e., an assist control is performed), and when the flag F_MAST is "0", the engine E is not assisted by the motor M. When the flag F_DODLMTV is "1", the cruise power generation correction coefficient is changed, as will be explained below, and when the flag F_DODLMTV is "0", the cruise power generation correction coefficient is not changed.

When it is determined in step S3 that the flag F_THIDLING is "0", i.e., the throttle is completely closed, and it is determined in step S4 that the vehicle speed V measured by the vehicle speed sensor S1 is zero, i.e., the vehicle is in a stopped state, the "idle mode" is selected in step S5, and fuel supply is re-started after a fuel cut operation, so that the engine E is maintained in the idling state.

When it is determined in step S3 that the flag F_THIDLING is "0", i.e., the throttle is completely closed, and it is determined in step S4 that the vehicle speed V measured by the vehicle speed sensor S1 is not zero, i.e., the "deceleration mode" is selected in step S6, the regenerative braking operation (the deceleration regeneration operation) is performed by the motor M.

When it is determined in step S3 that the flag F_THIDLING is "1", i.e., the throttle is open, the operation proceeds to step S7, in which a determination is performed using the flag F_MAST indicating whether assist by the motor M is to be performed for selecting one of the "acceleration mode" and the "cruise mode".

When it is determined in step S7 that the flag F_MAST is "1", the "acceleration mode" is selected in step S8, and the driving power of the engine is supplemented by the driving power of the motor M. In contrast, when it is determined in step S7 that the flag F_MAST is "0", the "cruise mode" is selected in step S8, and the motor M performs neither the powering operation nor the deceleration regeneration operation, i.e., the vehicle is driven solely by the engine E. The motor is operated in step S10 in accordance with the selected operation mode.

Figure 3:
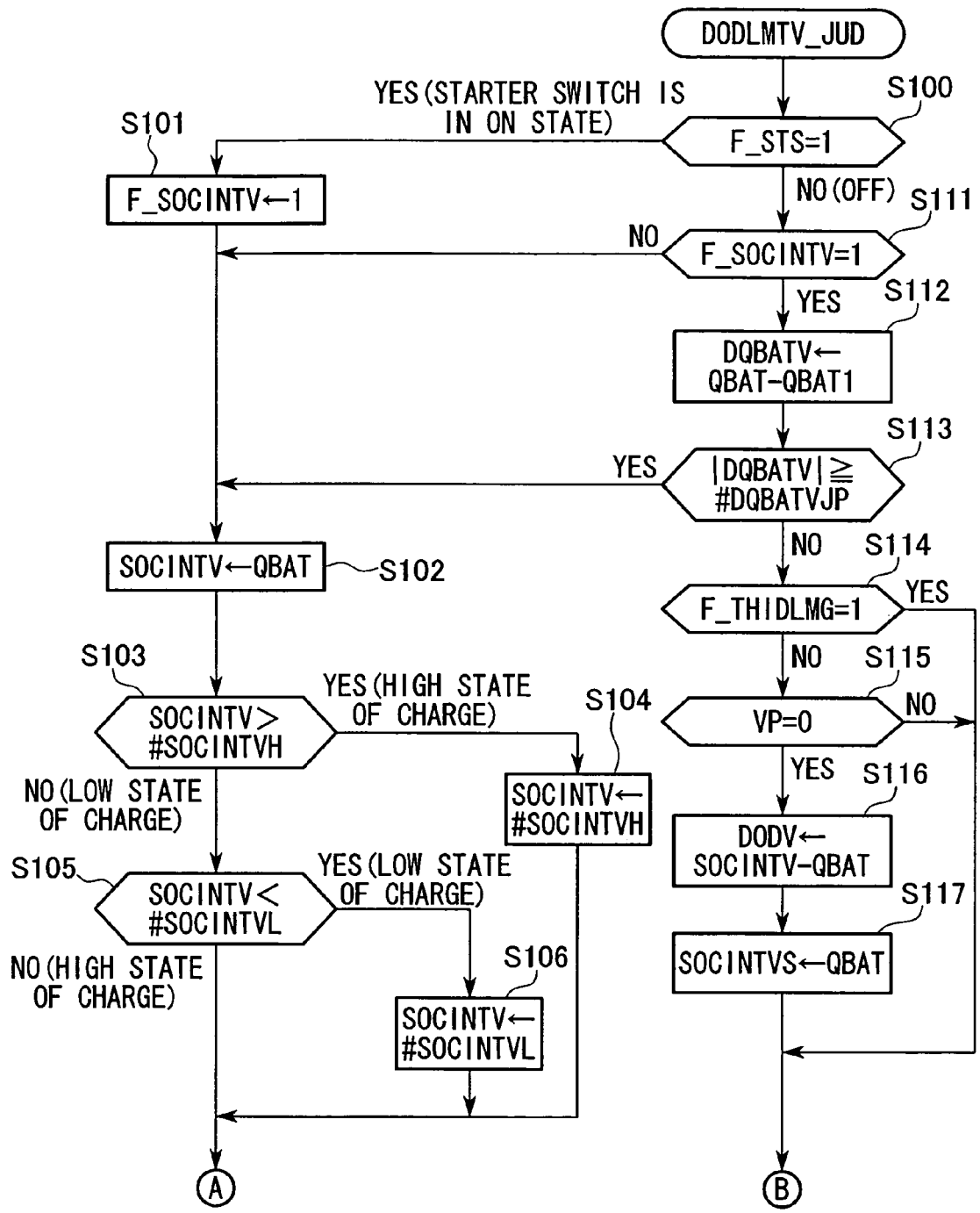
FIG. 3 is a flowchart showing the operation, according to an embodiment of the present invention, for determining whether the depth of discharge limitative control operation at a running interval is to be executed.
Figure 4:
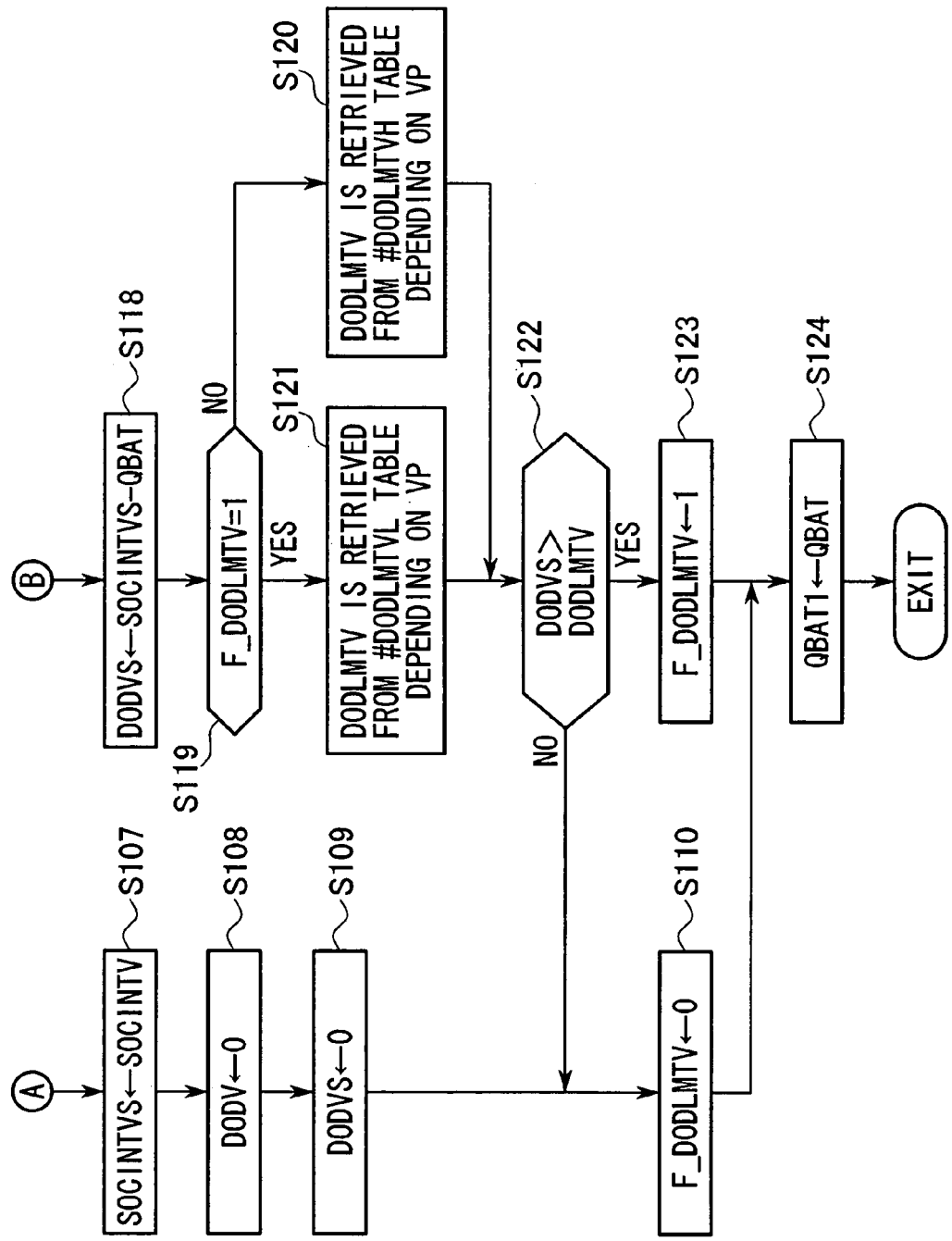
FIG. 4 is a flowchart showing the operation, according to an embodiment of the present invention, for determining whether the depth of discharge limitative control operation at a running interval is to be executed.

Next, the operation (DODLMTV_JUD) for determining whether the depth of discharge limitative control at every running interval is to be executed will be explained below with reference to the flowcharts shown in FIGS. 3 and 4.

This determination is, in other words, the operation for setting "1" or "0" to the flag F_DODLMTV, which indicates whether a cruise power generation correction coefficient is to be changed, by monitoring the depth of discharge (DOD) at every running interval, i.e., at every interval from the previous stop of the vehicle to the current stop, based on the state of charge of the battery. When the flag value of the flag F_DODLMTV is "1", an energy management operation based on the depth of discharge limitative control at every running interval is executed, and more specifically, the cruise power generation correction coefficient is changed so that the amount of power generation during the cruise mode is decreased from the normal amount. In addition, in this case, an assist amount correction coefficient (a correction coefficient for decreasing the amount of assist from the base amount), which is used until the next stop of the vehicle, is set depending on change in the state of charge of the battery with respect to the initial value. In contrast, when the flag value of the flag F_DODLMTV is "0", the energy management operation based on the depth of discharge limitative control at every running interval is not executed.

In step S100, it is determined whether a starter switch flag F_STS is "1" or "0", i.e., whether the current status is the beginning of the first run. When it is determined that the starter switch flag F_STS is "1", i.e., the current status is the beginning of the first run, the operation proceeds to step S101, in which a battery status initialization flag F_SOCINTV is set to be "1", and the operation proceeds to step S102. When the battery status initialization flag F_SOCINTV is "1", it means that initialization operations (through steps S102 to S110), which will be explained below, has been completed, and when the battery status initialization flag F_SOCINTV is "0", it means that the initialization operation has not been completed.

In step S102, an initial value of the state of charge at the beginning SOCINTV is set to a state of charge of the battery QBAT (the same meaning as the SOC), and the operation proceeds to step S103. The state of charge of the battery QBAT is obtained from the motor ECU 1.

In step S103, the initial value of the state of charge at the beginning SOCINTV is compared with an upper threshold #SOCINTVH. When the initial value of the state of charge at the beginning SOCINTV is greater than the upper threshold #SOCINTVH (i.e., the state of charge is high), the operation proceeds to step S104, in which the initial value of the state of charge at the beginning SOCINTV is set to be the upper threshold #SOCINTVH, and the operation proceeds to step S107.

In contrast, it is determined in step S103 that the initial value of the state of charge at the beginning SOCINTV is not greater than the upper threshold #SOCINTVH (i.e., the state of charge is low), the operation proceeds to step S105.

In step S105, the initial value of the state of charge at the beginning SOCINTV is compared with a lower threshold #SOCINTVL. When the initial value of the state of charge at the beginning SOCINTV is less than the lower threshold #SOCINTVL (i.e., the state of charge is low), the operation proceeds to step S106, in which the initial value of the state of charge at the beginning SOCINTV is set to be the lower threshold #SOCINTVL, and the operation proceeds to step S107.

In contrast, it is determined in step S105 that the initial value of the state of charge at the beginning SOCINTV is not less than the lower threshold #SOCINTVL (i.e., the state of charge is high), the operation proceeds to step S107.

In step S107, the initial value of the state of charge at the beginning SOCINTV is set to an initial value of the state of charge during the run SOCINTVS, and the operation proceeds to step S108.

In step S108, a DODV, i.e., the depth of discharge at a running interval with respect to the state of charge at the beginning of the run, is set to be "0". In step S109, a DODVS, i.e., the difference between the depth of discharge at a running interval and that at the previous stop, is set to be "0". In step S110, the flag F_DODLMTV, i.e., the flag indicating whether a cruise power generation correction coefficient is to be changed, is set to be "0", and the operation proceeds to step S124, in which the current state of charge of the battery QBAT is set to the previous state of charge of the battery QBAT1, and then the operation is terminated.

The above-mentioned DODV is the depth of discharge of the battery (expressed in percentage with a sign) which is renewed at every running interval, and which is defined with respect to the SOCINTV, i.e., the initial value of the state of charge at the beginning of the run.

The above-mentioned DODVS is the difference between the depth of discharge of the battery at a running interval and that at the previous stop (=0%), which is expressed in percentage with a sign.

When it is determined in step S100 that the starter switch flag F_STS is "0", i.e., the current status is not the beginning of the first run, the operation proceeds to step S111, in which it is determined whether the battery status initialization flag F_SOCINTV is "1". When the result of the determination is "YES", the operation proceeds to step S112, and when the result of the determination is "NO", the operation proceeds to step S102.

Accordingly, when the engine E is started at the first time, or when the engine E is restarted after a temporary stop during the running of the vehicle, e.g., when the engine E is automatically stopped due to, for example, traffic signals and is automatically restarted in the case in which the engine E is provided with an automatic stop-and-start control device, the result of the determination in step S100 is "NO", and the battery status initialization flag F_SOCINTV has been set to be "1" in step S101 in the previous control routine; therefore, the operation proceeds to step S112.

In step S112, the difference between the current state of charge QBAT and the previous state of charge QBAT1 is set to a state of charge difference DQBAT, and in subsequent step S113, the absolute value of the state of charge difference DQBAT is compared with a reference of difference DQBATVJP.

When it is determined in step S113 that the absolute value of the state of charge difference DQBAT is not less than the reference of difference DQBATVJP, the operation proceeds to step S102, and the initialization operations (through steps S102 to S110) are again executed. When it is determined in step S113 that the absolute value of the state of charge difference DQBAT is not less than the reference of difference DQBATVJP, the operation proceeds to step S102 in order to prevent a value, which is greatly different from the previous state of charge QBAT1 due to some reason, from being set to the SOCINTV. Accordingly, a value, which is greatly different from the previous state of charge QBAT1 due to some reason, will not be set to the SOCINTV, and unnecessary power generation, which may lead to increase in load of the engine and decrease in fuel economy, will not be performed.

In step S114, it is determined whether the throttle is completely closed based on the flag F_THIDLING When it is determined that the flag F_THIDLING is "0" (it is determined "NO"), i.e., when the throttle is completely closed, and when it is determined in step S115 that the vehicle speed is zero, i.e., the vehicle is in a stopped state, the operation proceeds to step S116. Accordingly, the operations through steps S116 to S118, which will be more specifically explained below, are executed when the vehicle is in a stopped state in which accurate values of energy can be stably measured because only small amounts of energy are sent and received.

When it is determined in step S114 that the flag F_THIDLING is "1", i.e., when the throttle is open, or when it is determined in step S115 that the vehicle speed is not zero, i.e., when the vehicle is in a running state, the operation proceeds to step S118, which corresponds to the first difference calculating section.

In step S116, a value, which is obtained by subtracting the current state of charge QBAT from the SOCINTV (i.e., the initial value of the state of charge at the beginning), is set to the DODV (i.e., the depth of discharge at a running interval with respect to the state of charge at the beginning of the run), and the operation proceeds to step S117.

According to the above operations, the DODV at every running interval can be obtained based on the SOCINTV (i.e., the initial value of the state of charge at the beginning), and the amount of assist after a stop (i.e., the assist amount correction coefficient) is set based on the DODV.

In step S117, the current state of charge QBAT is set to the SOCINTVS, i.e., to the initial value of the state of charge during the run, and the operation proceeds to step S118. This operation is provided for handling unexpected running conditions such as pressing the starter switch during the run.

In step S118, a value, which is obtained by subtracting the current state of charge QBAT from the SOCINTVS (i.e., the initial value of the state of charge during the run), is set to the DODVS (i.e., the difference between the depth of discharge at a running interval and that at the previous stop), and the operation proceeds to step S119.

The DODVS is used as it is when the DODVS is greater than zero, and when the DODVS is less than zero, "0" is used instead. In other words, the DODVS is used as it is only when the state of charge is decreased, and when the state of charge is increased, the DODVS is deemed to be "0". Such a control manner is employed because the series of the operations are provided for the case in which the state of charge tends to decrease, and because the state of charge is controlled by a state of charge zoning control when the state of charge tends to increase.

Accordingly, the difference between the state of charge at the previous stop and the current state of charge QBAT (which is decreased from the state of charge at the previous stop) can be obtained.

In step S119, it is determined whether the flag F_DODLMTV, which indicates whether a cruise power generation correction coefficient is to be changed, is "1". When the result of the determination is "YES", the operation proceeds to step S121, and when the result of the determination is "NO", the operation proceeds to step S120.

Figure 5:
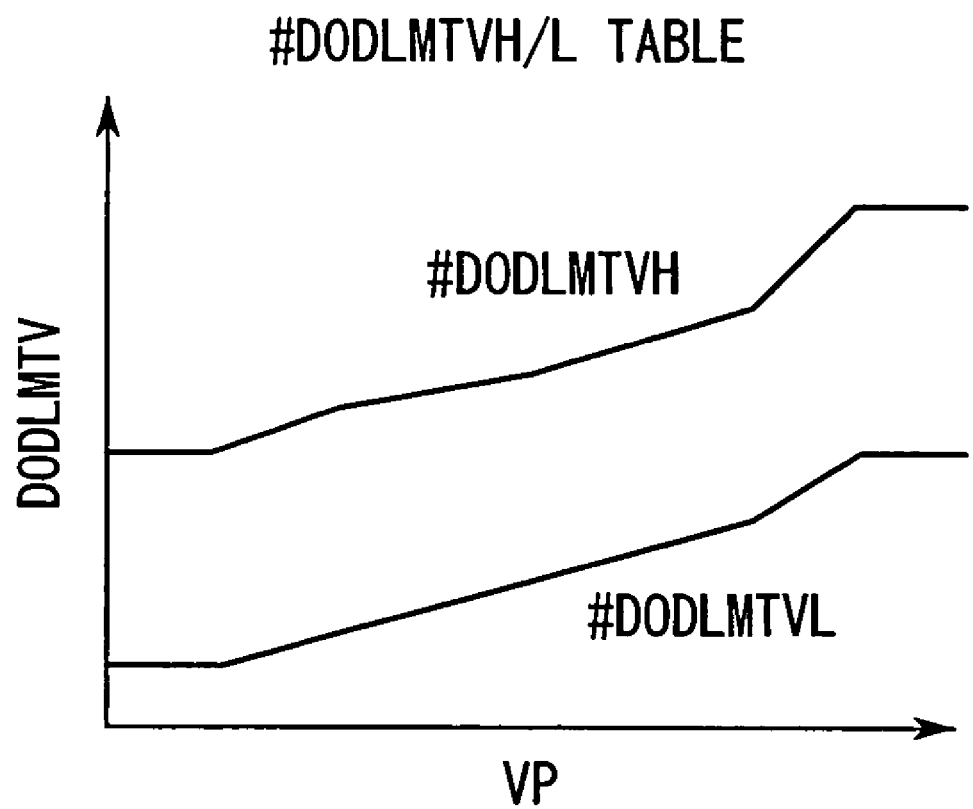
FIG. 5 is a graph drawn based on a #DODLMTVH/L table according to an embodiment of the present invention.

In steps S120 and S121, a DODLMTV, i.e., a reference value for change in the depth of discharge between running intervals, is retrieved from a #DODLMTVH/L table, which is represented by FIG. 5, and the operation proceeds to step S122. As shown in FIG. 5, a greater value is set for the DODLMTV as the vehicle speed VP is greater, because electrical energy can be sufficiently recovered even when the DODLMTV is great since the kinetic energy of the vehicle is greater when the vehicle speed VP is greater.

Because the reference value DODLMTV depends on the vehicle speed VP, the reference value DODLMTV can be determined while assuming that the greater the current vehicle speed, the greater the kinetic energy of the vehicle during the coming deceleration. As a result, an excessive recovery of electrical energy can be prevented, which would occur if the reference value is set to be too small a value when the vehicle speed is high.

The retrieval in step S120 is performed with reference to a DODLMTVH, i.e., with reference to a high reference value for change in the depth of discharge between running intervals, and the retrieval in step S121 is performed with reference to a DODLMTVL, i.e., with reference to a low reference value for change in the depth of discharge between running intervals. More specifically, a kind of hysteresis is provided in the reference value DODLMTV to prevent a hunting phenomenon by changing the reference value DODLMTV depending on the flag value of the flag F_DODLMTV indicating whether a cruise power generation correction coefficient is to be changed, i.e., by setting the high reference value DODLMTVH to be greater than the low reference value DODLMTVL by, for example, 0.5%.

In step S122, it is determined whether the DODVS, i.e., the difference between the depth of discharge at a running interval and that at the previous stop, is greater than the retrieved reference value DODLMTV.

When the result of the determination is "YES", i.e., the DODVS is greater than the reference value DODLMTV, the operation proceeds to step S123, and when the result of the determination is "NO", i.e., the DODVS is not greater than the reference value DODLMTV, the operation proceeds to step S110.

More specifically, when the DODVS is greater than the reference value DODLMTV, it is determined that the battery 3 tends to discharge, the flag F_DODLMTV, which indicates whether a cruise power generation correction coefficient is to be changed, is set to be "1" in subsequent step S123, which corresponds to the motor control changing section, in order to prepare for the next running interval in which the battery is supposed to be charged.

In step S123, the flag F_DODLMTV is set to be "1", and the current state of charge QBAT is set to the previous state of charge QBAT1 in step S124, and then the operation is terminated. Accordingly, for every stop of the vehicle, the battery 3 can be charged until the next stop of the vehicle.

Next, the operation for calculating the target amount of power generation during the cruise mode (CRSRGN) will be explained below with reference to the flowcharts shown in FIGS. 6 and 7.

In step S200, the amount of power generation during the cruise mode CRSRGNM is retrieved from a map. This map defines the amount of power generation depending on the engine revolution rate NE and the negative pressure in the air-intake passage PBGA, and the map is differently set for a CVT or for an MT (manual transmission).

Next, the operation proceeds to step S202, in which it is determined whether an energy storage zone D flag F_ESZONED is "1". When the result of the determination is "YES", i.e., the state of charge of the battery is in the zone D, the operation proceeds to step S223, in which the target amount of power generation during the cruise mode CRSRGN is set to be "0", and the operation proceeds to step S228.

In step S228, it is determined whether a final power generation command during the cruise mode CRSRGNF is "0". When it is determined in step S228 that final power generation command during the cruise mode CRSRGNF is not "0", the operation proceeds to step S229, in which the motor M is placed in a cruise power generation stopped mode, and the series of the control operations is terminated. When it is determined in step S228 that final power generation command during the cruise mode CRSRGNF is "0", the operation proceeds to step S230, in which the motor M is placed in a cruise battery discharging mode, and the series of the control operations is terminated. In the cruise battery discharging mode, the motor does not perform power generation, and electrical energy is supplied from the battery to the motor M, to the auxiliary battery 4, or to electrical accessories.

When the result of the determination in step S202 is "NO", i.e., the state of charge of the battery is not in the zone D, the operation proceeds to step S203, in which it is determined whether an energy storage zone C flag F_ESZONEC is "1". When the result of the determination is "YES", i.e., the state of charge of the battery is in the zone C, the operation proceeds to step S204, in which a cruise power generation correction coefficient KCRSRGN is set to be "1" ("1" corresponds to a strong power generation), and the operation proceeds to step S216, in which the operation for calculating the cruise power generation correction coefficient is executed, and then the operation proceeds to step S222, in which the motor M is placed in a cruise power generation mode, and the series of the control operations is terminated.

When the result of the determination in step S203 is "NO", i.e., the state of charge of the battery is not in the zone C, the operation proceeds to step S205.

In step S205, it is determined whether an energy storage zone B flag F_ESZONEB is "1". When the result of the determination is "YES", i.e., the state of charge of the battery is in the zone B, the operation proceeds to step S206, in which the cruise power generation correction coefficient KCRSRGN is set to be #KCRGNWK (#KCRGNWK corresponds to a moderate power generation), and the operation proceeds to step S213.

In contrast, when the result of the determination in step S205 is "NO", i.e., the state of charge of the battery is not in the zone B, the operation proceeds to step S207, in which it is determined whether the flag value of the DOD limitative control indication flag F_DODLMT is "1". When the result of the determination in step S207 is "YES", the operation proceeds to step S208, in which the cruise power generation correction coefficient KCRSRGN is set to be #KCRGNDOD (#KCRGNDOD corresponds to a DOD limitative power generation mode), and the operation proceeds to step S213.

In the DOD limitative power generation mode, as was explained in light of the related art, the amount of assist, the amount of power generation during the cruise mode, etc., are controlled so that the state of charge of the battery is quickly recovered when the current state of charge QBAT is decreased by a predetermined amount from the initial state of charge at the beginning of the run.

The DOD limitative power generation mode is similar to a DOD limitative power generation at every running interval mode, which will be explained below, in terms of referring to the initial value of the state of charge at the beginning of the run; however, in the DOD limitative power generation mode, the state of charge is continuously monitored, not at every stop of the vehicle, and when the state of charge is decreased by a predetermined amount from the initial state of charge at the beginning of the run, the state of charge is recovered to the initial state.

Accordingly, the state of charge of the battery 3 is quickly recovered because the amount of cruise power generation is set to be greater than that in a normal control operation, or that in a depth of discharge limitative control operation at every running interval, which will be explained below.

When the result of the determination in step S207 is "NO", the operation proceeds to step S209, in which it is determined whether the flag value of a F_ACC flag, which indicates whether the air conditioner of the vehicle is operated, is "1". When the result of the determination is "YES", i.e., the air conditioner is operated, the operation proceeds to step S210, in which the cruise power generation correction coefficient KCRSRGN is set to be #KCRGNHAC (#KCRGNHAC corresponds to a HAC_ON power generation mode), and the operation proceeds to step S213.

When the result of the determination in step S209 is "NO", i.e., the air conditioner is not operated, the operation proceeds to step S211, in which it is determined whether the flag value of a F_MACRS flag, which indicates a change in the vehicle speed during the cruise mode, is "1".

The F_MACRS flag is set to be "1" when the change in the vehicle speed during the cruise mode is within a predetermined range, and is set to be "0" when the change in the vehicle speed during the cruise mode is out of the predetermined range.

When the result of the determination in step S211 is "NO", i.e., the vehicle speed during the cruise mode is out of the predetermined range, the operation proceeds to step S217.

In step S217, it is determined whether the flag F_DODLMTV, which indicates whether a cruise power generation correction coefficient is to be changed, is "1". When the result of the determination is "YES", i.e., the flag F_DODLMTV is "1", the operation proceeds to step S218, and when the result of the determination is "NO", i.e., the flag F_DODLMTV is "0", the operation proceeds to step S219. In other words, only when the state of charge of the battery 3 is in the zone A (i.e., when the results of the determinations in steps S202, S203, and S205 are negative), the control mode of the motor M is changed so as to be in the DOD limitative power generation at every running interval mode, and thereby the amount of power generation is changed, and the amount of charging into the battery 3 is appropriately adjusted. Accordingly, the control operation for the motor M can be changed without applying restriction to the energy management in the hybrid vehicle while maintaining the state of charge of the battery 3 in an appropriate state, i.e., not in an over-charged state or not in an over-discharged state; therefore, the zone management for the battery 3 will not be affected.

In step S218, the cruise power generation correction coefficient KCRSRGN is set to be #KCRGNDODV (#KCRGNDODV corresponds to a DOD limitative power generation at every running interval mode), and the operation proceeds to step S214. Note that the cruise power generation correction coefficient #KCRGNDODV is set to be smaller than a cruise power generation correction coefficient #KCRGN (#KCRGN corresponds to a normal power generation mode), which will be explained below.

The motor M is placed in the normal cruse power generation mode (step S212) when it is determined in step S211 that the vehicle speed during the cruise mode is within the predetermined range; however, the motor M is forced to be in the DOD limitative power generation at every running interval mode when the vehicle speed during the cruise mode is out of the predetermined range due to transition to the acceleration mode or to the deceleration mode, i.e., when the motor M is not supposed to perform power generation because the normal cruise power generation has not been executed and assist of the engine E by the motor M or the deceleration regeneration operation by the motor M has not been executed.

Accordingly, by increasing frequency of power generation during the cruise mode, the state of charge of the battery 3 is appropriately maintained, and the demand of power assist requested by the engine E can also be fulfilled, and thus the energy management in the vehicle can be easily performed. The state of charge of the battery 3 can be determined at every stop of the vehicle, and the state of charge can be precisely controlled with a certain margin during the run until the next stop.

As explained above, by the above control operations, an energy management is achieved in which the depth of discharge of the battery 3 is controlled at every stop of the vehicle before being increased in a more precise manner compared with the case in which the control operations are executed, as in the DOD limitative power generation mode in step S208, when the state of charge is greatly decreased with respect to the initial value of the state of charge at the beginning of the run; therefore, performance and reliability of the vehicle can be further improved.

When the result of the determination in step S217 is "NO" (i.e., the flag F_DODLMTV is "0"), the operation proceeds to step S219.

In step S219, it is determined whether a large current flag F_ELMAH is "1". When the result of the determination is "YES", i.e., when it is determined that a large current flows, the operation proceeds to step S212, which will be explained below, and the result of the determination is "NO", the operation proceeds to step S225.

In step S225, the target amount of power generation during the cruise mode CRSRGN is set to be "0", and the operation proceeds to step S226.

When the result of the determination in step S211 is "YES", i.e., the vehicle speed during the cruise mode is within the predetermined range, the operation proceeds to step S212, in which the cruise power generation correction coefficient KCRSRGN is set to be #KCRGN (#KCRGN corresponds to the normal power generation mode), and the operation proceeds to step S213.

In step S226, it is determined whether the engine revolution rate NE is less than or equal to an upper limit engine revolution rate #NDVSTP for executing the cruise battery discharging mode. When the result of the determination is "YES", i.e., the engine revolution rate NE is not greater than the upper limit engine revolution rate #NDVSTP for executing the cruise battery discharging mode, the operation proceeds to step S227. In step S227, it is determined whether a downverter flag F_DV is "1". When the result of the determination is "YES", i.e., the downverter flag F_DV is "1", the operation proceeds to step S229. When the result of the determination in step S227 is "NO", i.e., the downverter flag F_DV is "0", the operation proceeds to step S228.

When the result of the determination in step S226 is "NO", i.e., the engine revolution rate NE is greater than the upper limit engine revolution rate #NDVSTP for executing the cruise battery discharging mode, the operation proceeds to step S229. Note that the upper limit engine revolution rate #NDVSTP for executing the cruise battery discharging mode includes hysteresis.

In step S213, it is determined whether the current state of charge QBAT is greater than or equal to an upper limit state of charge #QBATCRSRH for executing the normal power generation mode. Note that the upper limit state of charge #QBATCRSRH for executing the normal power generation mode includes hysteresis.

When the result of the determination in step S213 is "YES", i.e., the current state of charge QBAT is not less than the upper limit state of charge #QBATCRSRH for executing the normal power generation mode, the operation proceeds to step S225.

In contrast, when it is determined that the current state of charge QBAT is less than the upper limit state of charge #QBATCRSRH for executing the normal power generation mode, the operation proceeds to step S214, in which it is determined whether a lean burn mode indication flag F_KCMLB is "1". When the result of the determination is "YES", i.e., the engine is in a lean burn mode, the operation proceeds to step S215, in which a value, which is obtained by multiplying the cruise power generation correction coefficient KCRSRGN by a cruise power generation coefficient #KCRGNLB (#KCRGNLB corresponds to a lean burn power generation mode), is set to the cruise power generation correction coefficient KCRSRGN, and the operation proceeds to step S216. When the result of the determination in step S214 is "NO", i.e., the engine is not in the lean burn mode, the operation also proceeds to step S216, and the motor M is placed in the cruise power generation mode in step S222, and then the control operation is terminated.

Next, the operations for calculating the amount of assist (more specifically, the operations for calculating the amount of ECO assist and the operations for calculating the amount of WOT assist) will be explained below with reference to the flowcharts shown in FIGS. 8 and 9. The amount of assist by the motor M for the engine E (more specifically, the assist amount correction coefficient) is determined depending on a difference of the state of charge with respect to the initial value, i.e., depending on the difference between the current state of charge and the initial state of charge, which is obtained at every stop of the vehicle. The flowcharts shown in FIGS. 8 and 9 only illustrate how the amount of assist is corrected with respect to a base amount of assist, and the operations for calculating the base amount of assist, e.g., the operation for gradually correcting the amount of assist to the final amount of assist so as to avoid vehicle jolt, the operation for correcting the amount of assist depending on the state of charge, the operations for setting various flags, etc., are indicated by the broken lines, for which explanation is omitted.

The case, in which the power of the engine is supplemented by the motor, is divided into two cases; one is the case in which the engine E is operated in a partial load zone, and the other is the case in which the engine E is operated in a full load zone. More specifically, one is designated as ECO assist mode in which an acceleration request is made when the engine E is operated in the partial load zone, and then the engine E is assisted by the motor M, and the other is designated as WOT assist mode in which an acceleration request is made when the engine E is operated in the full load zone, and then the engine E is assisted by the motor M. In the partial load zone, the engine E is assisted by the motor M when negative pressure in the air-intake passage due to pressing of the accelerator pedal by the driver exceeds a threshold (i.e., an assist trigger threshold) for the intake negative pressure. In the full load zone, the engine E is assisted by the motor M when a depressed amount of the accelerator pedal due to pressing of the accelerator pedal by the driver exceeds a threshold (i.e., an assist trigger threshold) for the opening degree of the throttle. Whether or not the engine E should be assisted by the motor M is determined in step S2 in FIG. 2, and the flag value of the motor assist indication flag F_MAST is set, accordingly.

Figure 8:
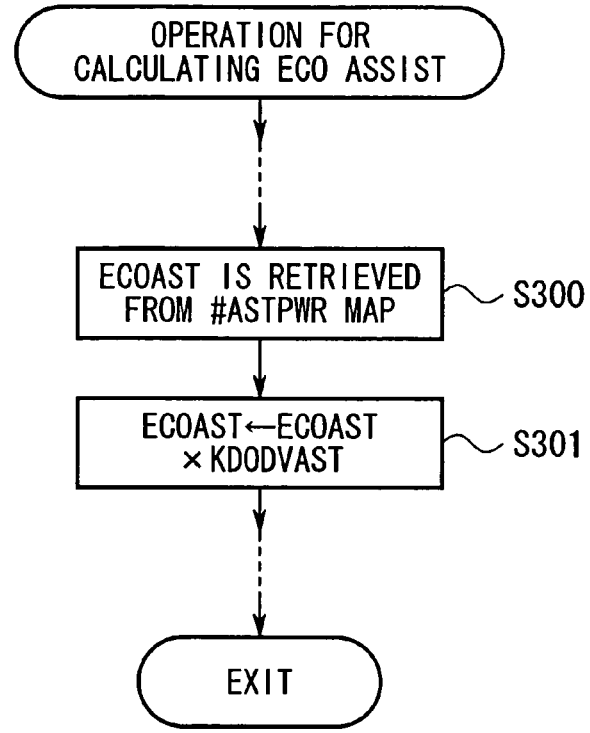
FIG. 8 is a flowchart showing the operation for calculating an amount of ECO assist according to an embodiment of the present invention.

FIG. 8 illustrates the operation for calculating the amount of ECO assist. In step S300, the amount of assist ECOAST (the amount of driving power) is retrieved from a #ASTPWR map. The #ASTPWR map defines the amount of assist ECOAST depending on the engine revolution rate NE and the negative pressure in the air-intake passage PBGA, and the #ASTPWR map is differently made depending on whether the transmission of the vehicle is a manual transmission or a CVT.

In step S301, the amount of assist ECOAST is obtained by multiplying the amount of assist ECOAST obtained in step S300 by the correcting coefficient for the depth of discharge limitative control KDODVAST, and the operation is terminated.

Figure 10:
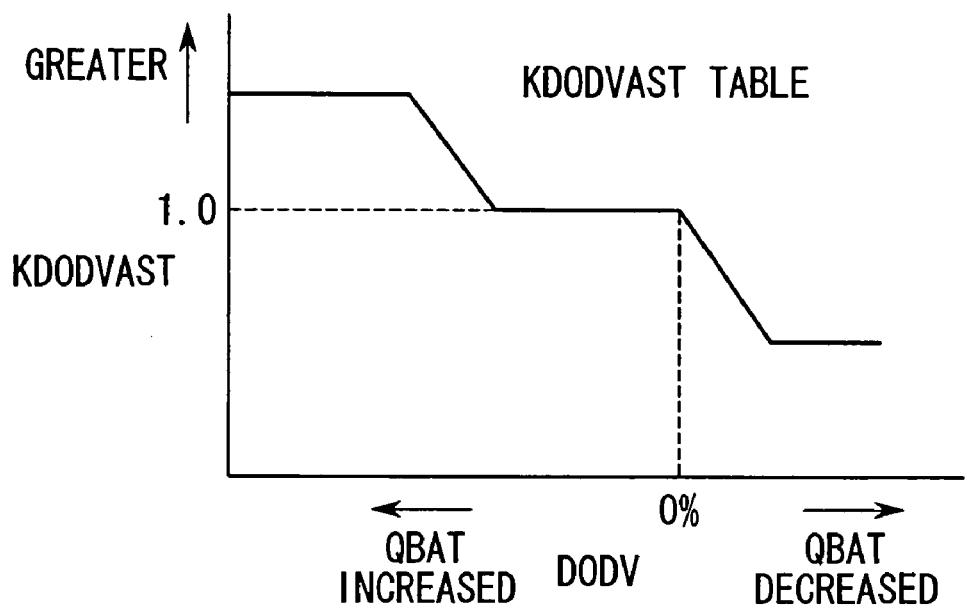
FIG. 10 is a graph drawn based on a KDODVAST table according to an embodiment of the present invention.

The correcting coefficient for the depth of discharge limitative control KDODVAST is retrieved from a table, which is represented by FIG. 10, depending on the DODV (the depth of discharge at a running interval with respect to the state of charge at the beginning of the run). As shown in FIG. 10, when the DODV is 0%, the KDODVAST is set to be 1.0. The KDODVAST may be set to be less than 1.0 as the current state of charge QBAT increases from a point at which the DODV is 0%, and may be set to be greater than 1.0 as the current state of charge QBAT decreases from the point at which the DODV is 0%.

In other words, when the state of charge at a stop of the vehicle is decreased from the state of charge QBAT at the beginning of the run, the amount of assist ECOAST is set to be a lower value, and when the state of charge at a stop of the vehicle is incresed from the state of charge QBAT at the beginning of the run, the amount of assist ECOAST is set to be a higher value. As a result, the amount of assist ECOAST can be precisely set at every stop of the vehicle.

Figure 9:
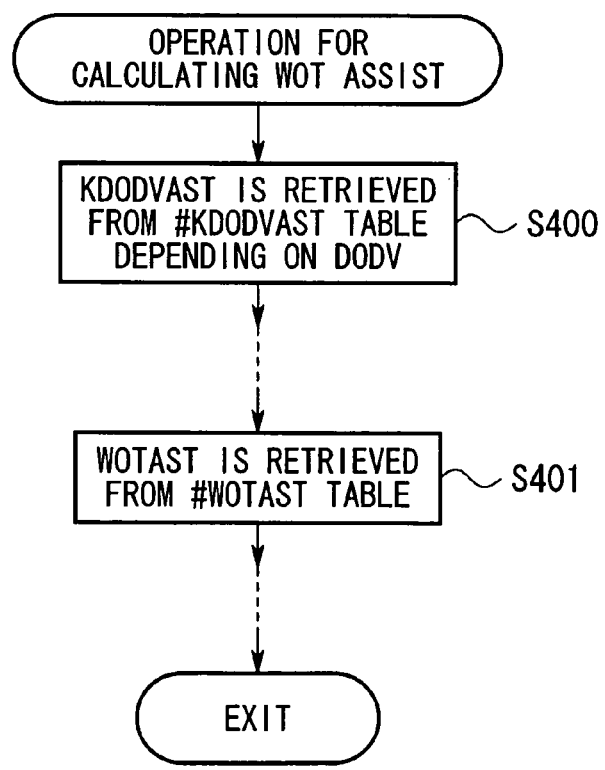
FIG. 9 is a flowchart showing the operation for calculating an amount of WOT assist according to an embodiment of the present invention.

On the other hand, FIG. 9 illustrates the operation for calculating the amount of WOT assist. In step S400, the correcting coefficient for the depth of discharge limitative control KDODVAST is retrieved from a KDODVAST table depending on the DODV (the depth of discharge at a running interval with respect to the state of charge at the beginning of the run).

In step S401, the amount of assist WOTAST is retrieved from a #WOTAST table depending on a current opening degree of the throttle THEM.

When the engine E is assisted by the motor M from the partial load zone to the full load zone, there is a large difference between the amount of assist WOTAST in the partial load zone and the amount of assist WOTAST in the full load zone.

Figure 11:
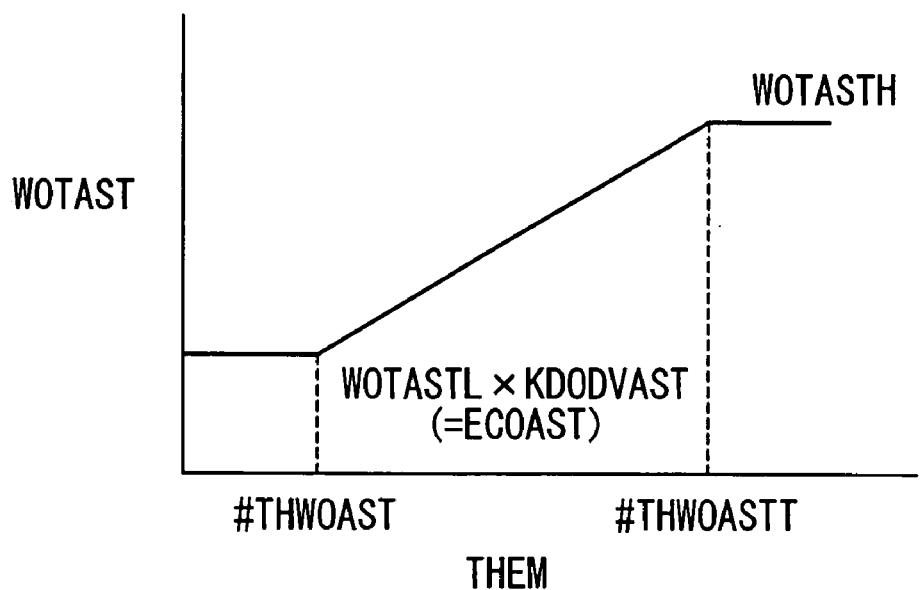
FIG. 11 is a graph showing the relationship between an amount of assist WOTAST and a current opening degree of the throttle THEM

Therefore, in this embodiment, in order to smoothly change the amount of assist from the partial load zone (corresponding to a small opening degree of the throttle #THWOAST) to the full load zone (corresponding to a large opening degree of the throttle #THWOASTT), the amount of assist is determined by interpolation between a low amount of assist WOTASTL and a high amount of assist WOTASTH depending on the THEM, as shown in FIG. 11. The low amount of assist WOTASTL is equal to the amount of assist ECOAST, which is obtained by multiplying the retrieved ECOAST by the KDODVAST.

Because the amount of assist in the partial load zone is corrected by the KDODVAST, the amount of assist during the transition from the partial load zone to the full load zone is smoothly changed taking into account the similar correction.

According to the above embodiment, when it is determined that the change in the state of charge of the battery 3 tends to decrease based on the DODVS, i.e., the difference between the depth of discharge at a running interval and that at the previous stop, the amount of power generation by the motor M during the cruise mode can be decreased, and thus the control operations for charging of the battery 3 can be more precisely performed in accordance with the state of charge of the battery 3 at every running interval of the vehicle; therefore, an appropriate energy management during the cruise mode can be achieved. In addition, because the operations through steps S116 to S118, more specifically, the operations in steps S116 and S118, are executed when the vehicle is in a stopped state in which only small amounts of energy are sent and received, and accurate values of energy can be stably measured, reliability in controlling the motor M and the battery 3 can be greatly improved.

Moreover, for the assist by the motor M in the coming running interval, the amount of assist ECOAST in the partial load zone and the amount of assist WOTAST during the transition to the full load zone (from the low amount of assist WOTASTL to the high amount of assist WOTASTH) can be determined based on the DODV, i.e., the depth of discharge at a running interval with respect to the state of charge of the battery 3 at the beginning of the run; therefore, the control operations for the assist operation by the motor M can be precisely performed at every running interval in accordance with the state of the battery 3, and thus an appropriate energy management during the assist operation can be achieved.

Figure 6:
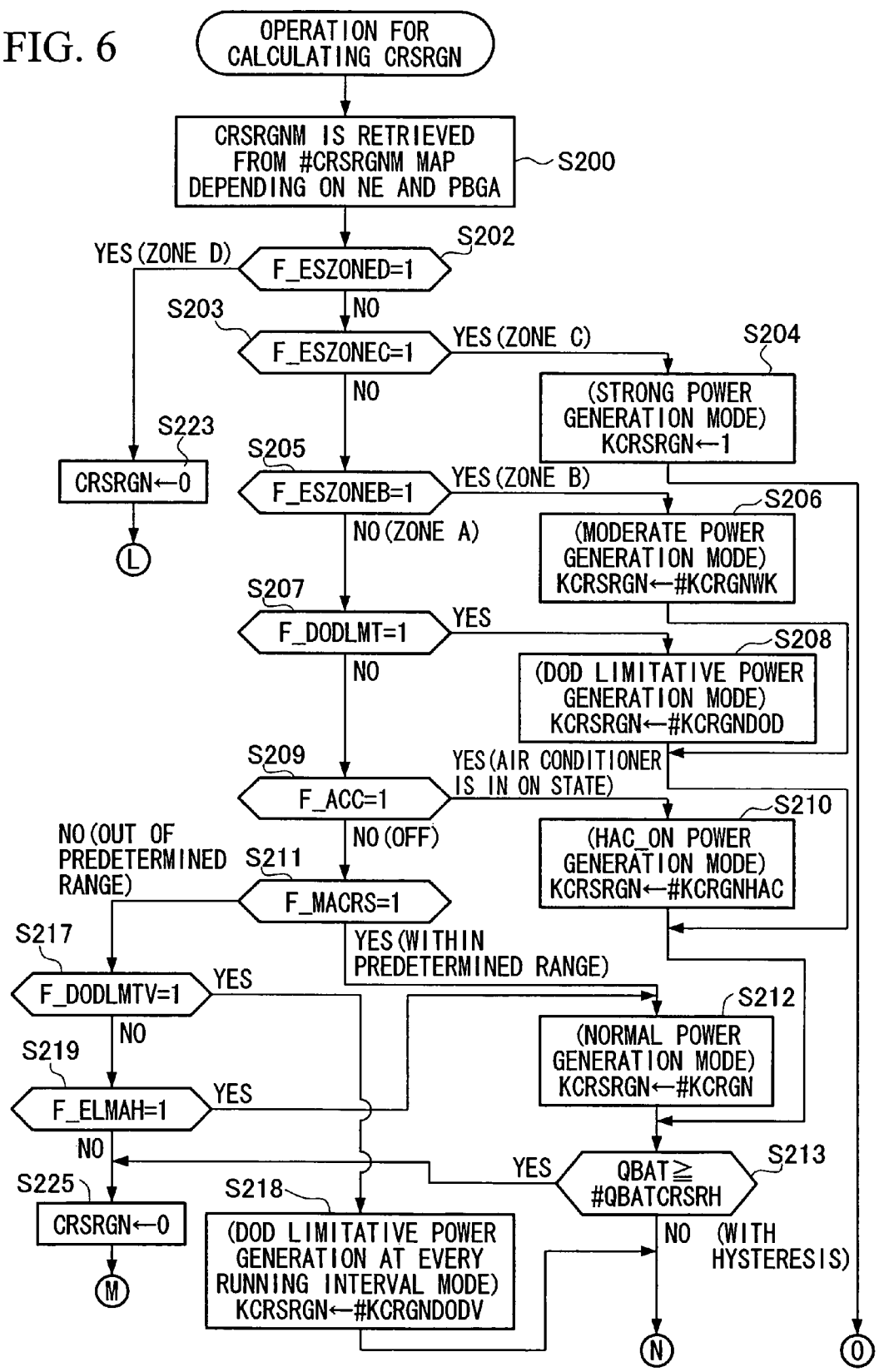
FIG. 6 is a flowchart showing the operation for calculating a target amount of power generation during a cruise mode according to an embodiment of the present invention.
Figure 7:
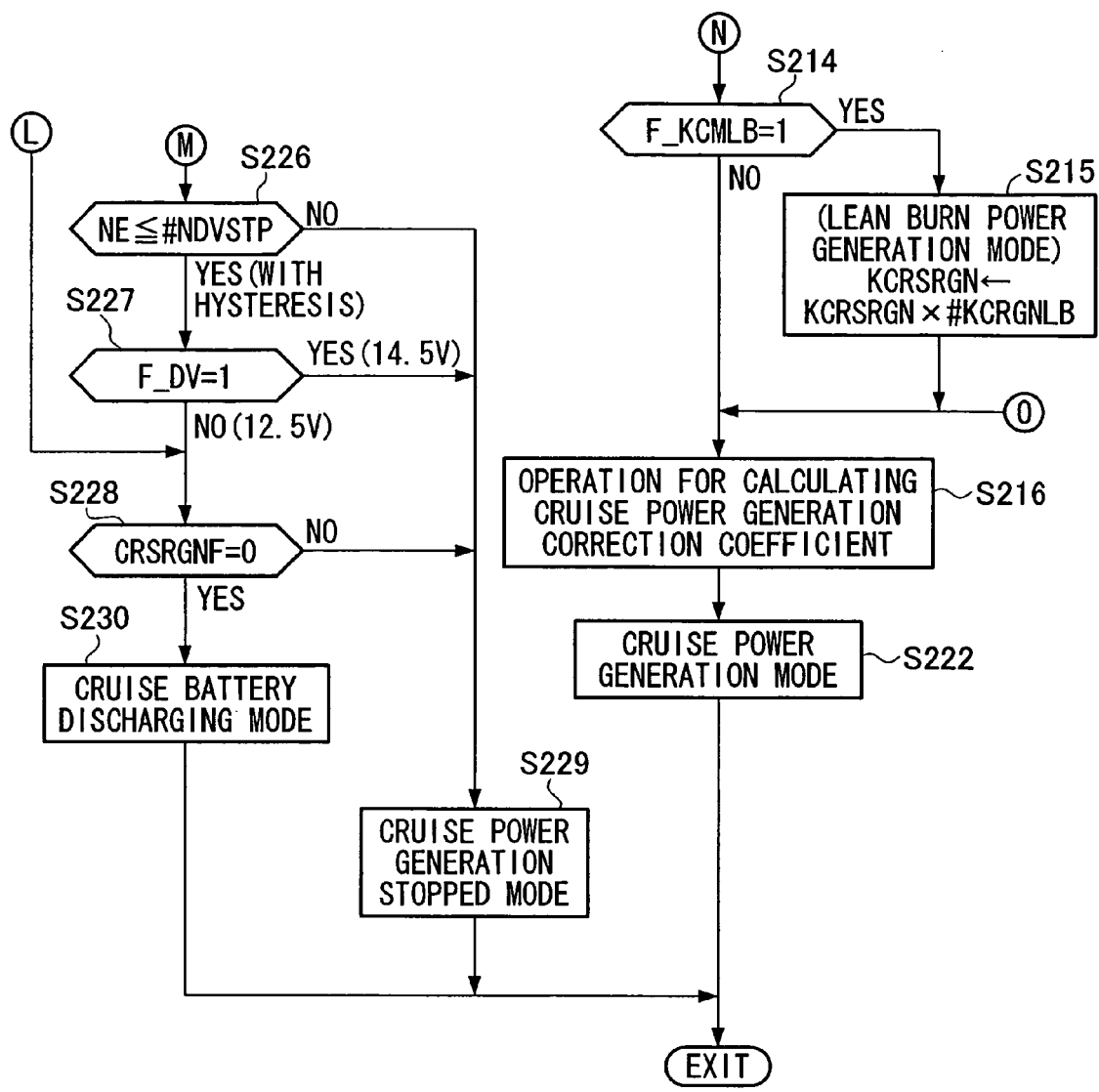
FIG. 7 is a flowchart showing the operation for calculating the target amount of power generation during the cruise mode according to an embodiment of the present invention.

When the state of charge of the battery 3 is greatly decreased with respect to the initial state of charge due to some reason during such a precise energy management by executing the depth of discharge limitative control operation at every running interval, by executing the depth of discharge limitative control operation in steps S207 and S208 shown in FIG. 6 so as to obtain greater amount of power generation than in the case of the depth of discharge limitative control operation at every running interval, the state of charge of the battery 3 can be quickly recovered.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the table represented in FIG. 10 is just an example. In the above embodiments, the present invention is applied to a battery as the energy storage; however, the present invention may also be applied to a capacitor. In the above embodiments, both the depth of discharge limitative control operation and the depth of discharge limitative control operation at every running interval are incorporated; however, if an appropriate energy management can be achieved just by executing the depth of discharge limitative control operation at every running interval, the depth of discharge limitative control operation may be omitted.

Advantageous Effects Obtainable by the Invention

As explained above, according to the control apparatus of the present invention, when it is determined that the change in the state of charge of the energy storage device, i.e., the difference between the depth of discharge at a running interval and that at the previous stop, tends to decrease, the amount of power generation by the motor during the cruise mode can be decreased, and thus the control operations for charging of the energy storage device can be more precisely performed in accordance with the state of charge of the energy storage device at every running interval of the vehicle; therefore, an appropriate energy management during the cruise mode can be achieved.

According to another control apparatus of the present invention, the amount of assist by the motor in the coming running interval can be adjusted based on the depth of discharge at a running interval with respect to the state of charge of the energy storage device at the beginning of the run; therefore, the control operations for the assist operation by the motor can be precisely performed at every running interval in accordance with the state of the energy storage device, and thus an appropriate energy management during the assist operation can be achieved.

According to another control apparatus of the present invention, the motor can be operated in a zone in which the motor is not supposed to operate, e.g., in a zone in which the motor performs neither an assist operation for the engine nor a deceleration regeneration operation, or in a zone in which the motor performs neither a driving operation nor a deceleration regeneration operation; therefore, the motor can be efficiently used.

According to another control apparatus of the present invention, the amount of assist by the motor in the coming running interval can be adjusted based on the depth of discharge at a running interval with respect to the state of charge of the energy storage device at the beginning of the run; therefore, the motor can be precisely controlled at every running interval in accordance with the state of the energy storage device, and the control operations for the assist operation by the motor can also be precisely performed at every running interval in accordance with the state of the energy storage device, and thus an appropriate energy management during the assist operation can be achieved.

According to another control apparatus of the present invention, the reference value for change in the depth of discharge between running intervals can be determined while assuming that the greater the current vehicle speed, the greater the kinetic energy of the vehicle during the coming deceleration; therefore, an excessive recovery of electrical energy can be prevented, which would occur if the reference value is set to be too small a value when the vehicle speed is high.

According to another control apparatus of the present invention, the control operation for the motor can be changed without applying restriction to the energy management in the hybrid vehicle while maintaining the state of charge of the energy storage device in an appropriate state, i.e., not in an over-charged state or not in an over-discharged state; therefore, the zone management for the energy storage device will not be affected.

According to another control apparatus of the present invention, the amount of charging energy to the energy storage device can be appropriately adjusted by changing the amount of power generation by the motor; therefore, the energy storage device can be appropriately and precisely charged.

According to another control apparatus of the present invention, by increasing frequency of power generation during the cruise mode, the state of charge of the energy storage device is appropriately maintained, and the demand of power assist requested by the engine can also be fulfilled, and thus the energy management in the vehicle can be easily performed. As a result, the state of charge of the energy storage device can be determined at every stop of the vehicle, and the state of charge can be precisely controlled with a certain margin during the run until the next stop.

What is claimed is:

1. A control apparatus for a hybrid vehicle comprising:
an engine and a motor as power sources of the hybrid vehicle;
an energy storage device for storing electrical energy converted, by the motor, from the output power of the engine or the kinetic energy of the hybrid vehicle; and
a control device which is adapted to obtain, at every stop of the hybrid vehicle, a first difference between the state of charge of the energy storage device at the immediately previous stop of the hybrid vehicle and the current state of charge, and to change an amount of power generation by the motor depending on the first difference when driving of the hybrid vehicle is not performed by the motor or when a regenerative deceleration operation is not performed by the motor.

2. A control apparatus according to claim 1, wherein the control device is further adapted to obtain, at every stop of the hybrid vehicle, a second difference between the initial state of charge of the energy storage device at the beginning of a running operation of the hybrid vehicle and the current state of charge, and to change an amount of driving power of the motor depending on the second difference.

3. A control apparatus for a hybrid vehicle comprising:
an engine as a power source of the hybrid vehicle;
a motor for supplying supplementary power to the engine;
an energy storage device for storing electrical energy converted, by the motor, from the output power of the engine or the kinetic energy of the hybrid vehicle; and
a control device,
wherein the control device comprises:
a running state determining section for determining the running state of the hybrid vehicle;
a state of charge calculating section for calculating the state of charge of the energy storage device;
a first difference calculating section for calculating, at every stop of the hybrid vehicle, a first difference between the state of charge of the energy storage device at the immediately previous stop of the hybrid vehicle and the current state of charge using outputs from the running state determining section and the state of charge calculating section; and
a motor control changing section for comparing the first difference with a predetermined reference value and for changing a control operation for the motor when the first difference is greater than the predetermined reference value.

4. A control apparatus according to claim 3,
wherein the control device further comprises a second difference calculating section for calculating, at every stop of the hybrid vehicle, a second difference between the initial state of charge of the energy storage device at the beginning of a running operation of the hybrid vehicle and the current state of charge, and
wherein the motor control changing section is adapted to change an amount of the supplementary power supplied from the motor to the engine depending on the second difference.

5. A control apparatus according to claim 3, wherein the reference value is determined depending on a vehicle speed.

6. A control apparatus according to claim 3,
wherein the control device further comprises a zone determining section for determining whether the current state of charge of the energy storage device is in a normal use zone, in an over-discharged zone, or in an over-charged zone, and
wherein the motor control changing section is adapted to change the control operation for the motor when the state of charge of charge of the energy storage device is in a normal use zone.

7. A control apparatus according to claim 3, wherein the motor control changing section is adapted to change an amount of power generation by the motor when the motor is driven as a generator by the engine.

8. A control apparatus according to claim 7,
wherein the motor is adapted to be controlled in an acceleration mode, in a deceleration mode, and in a cruise mode, and
wherein the motor control changing section is adapted to change the amount of power generation by the motor at least during the cruise mode.

* * * * *